US009206593B2

(12) United States Patent
Tripodi et al.

(10) Patent No.: US 9,206,593 B2
(45) Date of Patent: *Dec. 8, 2015

(54) ADJUSTABLE DRAIN

(71) Applicant: Zurn Industries, LLC, Erie, PA (US)

(72) Inventors: Joseph Tripodi, Erie, PA (US); Douglas R. Wroblewski, Erie, PA (US); James T. Kloecker, Erie, PA (US)

(73) Assignee: Zurn Industries, LLC, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/926,002

(22) Filed: Jun. 25, 2013

(65) Prior Publication Data

US 2013/0313174 A1 Nov. 28, 2013

Related U.S. Application Data

(63) Continuation of application No. 11/827,669, filed on Jul. 12, 2007, now Pat. No. 8,486,260.

(60) Provisional application No. 60/831,855, filed on Jul. 19, 2006.

(51) Int. Cl.
*E03F 5/14* (2006.01)
*E03F 5/04* (2006.01)

(52) U.S. Cl.
CPC .............. *E03F 5/14* (2013.01); *E03F 5/0407* (2013.01); *E03F 2005/0413* (2013.01)

(58) Field of Classification Search
None
See application file for complete search history.

(56) References Cited

U.S. PATENT DOCUMENTS

| 2,019,779 | A | 11/1935 | Fleming |
| 2,672,205 | A | 3/1954 | McDonald |
| 2,689,017 | A | 9/1954 | Schmid |
| 2,749,999 | A | 6/1956 | Schmid |
| 3,246,582 | A | 4/1966 | Wade et al. |
| 4,943,100 | A | 7/1990 | Emberson |
| 5,022,430 | A | 6/1991 | Degooyer |
| 5,408,706 | A | 4/1995 | Barnes |
| 5,722,791 | A | 3/1998 | Dallmer |
| 5,745,931 | A | 5/1998 | Ball |
| 6,175,971 | B1 | 1/2001 | O'Neill |
| 6,682,258 | B2 | 1/2004 | McNeely |
| 6,872,029 | B2 | 3/2005 | Allard et al. |
| 6,986,621 | B2 | 1/2006 | Allard |
| 7,040,838 | B2 | 5/2006 | Allard et al. |
| 2002/0048490 | A1 | 4/2002 | Allard et al. |
| 2002/0159838 | A1 | 10/2002 | Allard |
| 2002/0164209 | A1 | 11/2002 | Allard et al. |
| 2008/0017562 | A1 | 1/2008 | Tripodi et al. |

*Primary Examiner* — Robert James Popovics
(74) *Attorney, Agent, or Firm* — Quarles & Brady LLP

(57) ABSTRACT

A drain assembly includes a receptacle body with a first end and a second end defining a cavity therebetween, an adjustable collar, and a grate. The first end of the receptacle body forms an opening into the cavity and comprises a peripheral step with a connection flange extending substantially perpendicularly therefrom, and a peripheral flange with a substantially horizontal support portion extending away from the connection flange. The connection flange includes a series of vertical slots for accommodating horizontally-oriented fastening members, and the connection flange and the peripheral flange define a channel therebetween. The adjustable collar comprises a first flange positioned adjacent to the connection flange of the peripheral step, and a second flange extending substantially perpendicular from the first flange. The first flange includes a series of holes which align with the series of vertical slots in the connection flange.

8 Claims, 5 Drawing Sheets

ADJUSTABLE DRAIN

CROSS REFERENCE TO RELATED APPLICATIONS

This application claims benefit of U.S. patent application Ser. No. 11/827,669 entitled "Adjustable Drain" filed Jul. 12, 2007, which claims benefit of U.S. Provisional Patent Application No. 60/831,855 entitled "Adjustable Drain" filed Jul. 19, 2006, which are both hereby incorporated by reference in their entirety.

BACKGROUND OF THE INVENTION

1. Field of the Invention

The present invention relates to a drain assembly, more particularly, to a drain assembly with an adjustable collar.

2. Description of Related Art

Floor drain assemblies are widely installed in the floors of structures where there will be or is the potential for water to be present. Floor drain assemblies connect the floor to a waste removal system such as a storm or sanitary sewer. A variety of floor drain assemblies also include a collar that is adapted to secure linoleum or other waterproofing material between the collar and the body of the drain assembly.

For instance, U.S. Pat. No. 3,246,582 to Wade, et al discloses an adjustable square drain wherein the height of the drain may be adjusted by an adjustable square collar. The square collar is telescopically adjustable. This telescopic adjustment is provided by four set adjustment heights for collar via the use of four different-sized inserted pads.

Also, U.S. Pat. No. 5,408,706 to Barnes discloses a fitting assembly for a vinyl-lined pool. A vinyl liner is sandwiched between a clamping ring and a fitting that is placed in a concrete wall of the pool. A fastener is used to secure the sandwiched connection between the vinyl liner and the ring and fitting.

However, such prior art drains do not include collars that may be adjusted vertically to accommodate for uneven flooring, and to ensure that the top edges of the drain and grate do not protrude from the floor or are sunken into the floor.

Accordingly, a need exists for a drain assembly with an adjustable collar that can be adjusted vertically to accommodate for uneven flooring. A further need exists for a drain assembly that can be installed quickly, easily, and efficiently.

SUMMARY OF THE INVENTION

The present invention is directed to a drain assembly comprising a receptacle body with a first end and a second end defining a cavity therebetween and an adjustable collar. The first end of the receptacle body forms an opening into the cavity and includes a peripheral step with a connection flange extending substantially perpendicularly therefrom, and a peripheral flange with a substantially horizontal support portion extending away from the connection flange. The connection flange includes a series of passageways for accommodating fastening members oriented in a first direction, and the connection flange and the peripheral flange define a channel therebetween. The adjustable collar includes a first flange positioned adjacent to the connection flange of the peripheral step, and a second flange extending substantially perpendicular from the first flange. The first flange includes a series of holes which align with the series of passageways in the connection flange. A grate supported by the peripheral step of the first end of the receptacle body may be positioned over the opening of the receptacle body.

The passageways may be elongated in a second direction. The first direction may be opposite of the second direction. For instance, the first direction may be horizontal and the second direction may be vertical.

Flooring, waterproofing material, linoleum or any combination thereof may be fitted in the channel between the connection and the peripheral flange and secured between the second flange of the adjustable collar and the peripheral flange by tightening the fastening members positioned in the passageways of the connection flange and the series of holes in the first flange. The passageways in the connection flange allow the height of the adjustable collar to be adjusted to accommodate for uneven flooring.

The peripheral flange may be connected to the first end of the receptacle body. Further, the second end of the receptacle body may be configured to receive a pipe. The grate, adjustable collar and receptacle body may be constructed from stainless steel, and the receptacle body may have a generally rectangular shape.

The present invention is also a method for attaching flooring to a drain assembly. The method includes the steps of providing a drain assembly. The drain assembly includes a receptacle body with a first end and a second end defining a cavity therebetween. The first end forms an opening into the cavity. The receptacle body includes a peripheral step with a connection flange extending substantially perpendicularly therefrom. The connection flange includes a series of passageways for accommodating fastening members oriented in a first direction. The receptacle body also includes a peripheral flange with a substantially horizontal support portion extending away from the connection flange. The connection flange and the peripheral flange define a channel therebetween. The drain assembly also includes an adjustable collar comprising a first flange positioned adjacent to the connection flange of the peripheral step and a second flange extending substantially perpendicular from the first flange. The first flange includes a series of holes which align with the series of passageways in the connection flange. Once the drain assembly has been provided, the method continues by fitting flooring material in the channel between the connection flange and the peripheral flange. Next, the fastening members positioned in the passageways of the connection flange and the series of holes in the first flange of the adjustable collar are tightened thereby securing the flooring between the second flange of the adjustable collar and the peripheral flange.

The passageways may be elongated in a second direction. The first direction may be opposite of the second direction. For instance, the first direction may be horizontal and the second direction may be vertical.

The second end of the receptacle body may be coupled to a pipe. The passageways in the connection flange may be configured to allow the height of the adjustable collar to be adjusted to accommodate for uneven flooring. A grate may be positioned over the opening of the receptacle body. The grate may be supported by the peripheral step.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. As used in the specification and the claims, the singular form of "a", "an", and "the" include plural referents unless the context clearly dictates otherwise.

DETAILED DESCRIPTION OF THE PRESENT INVENTION

Figure 1:
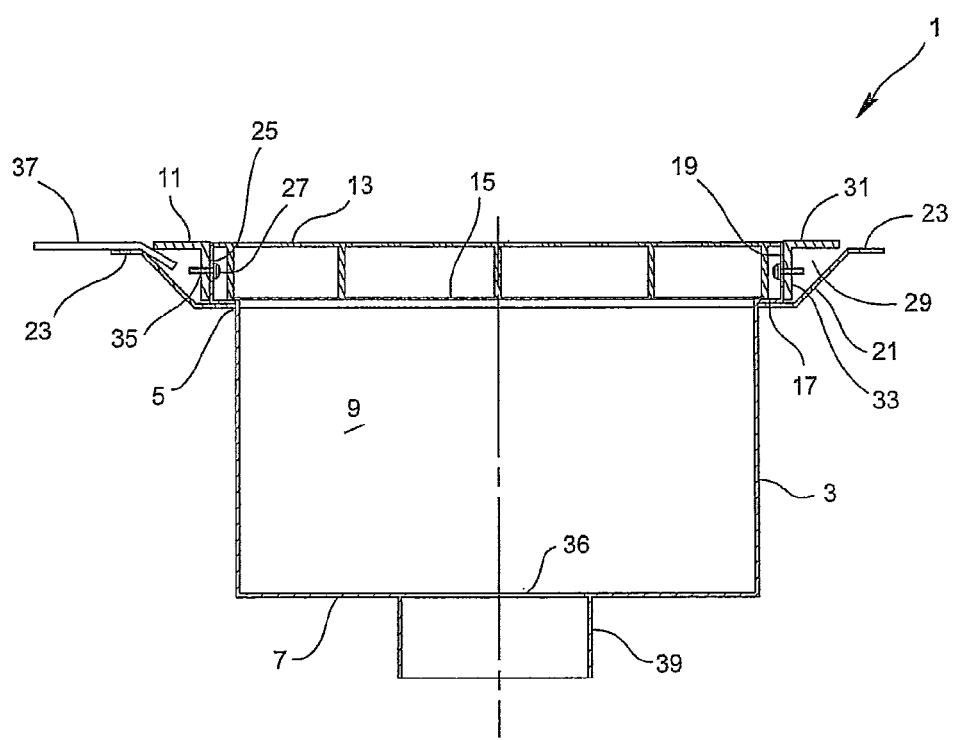
FIG. 1 is a cross-sectional view of a drain assembly in accordance with the present invention.
Figure 2:
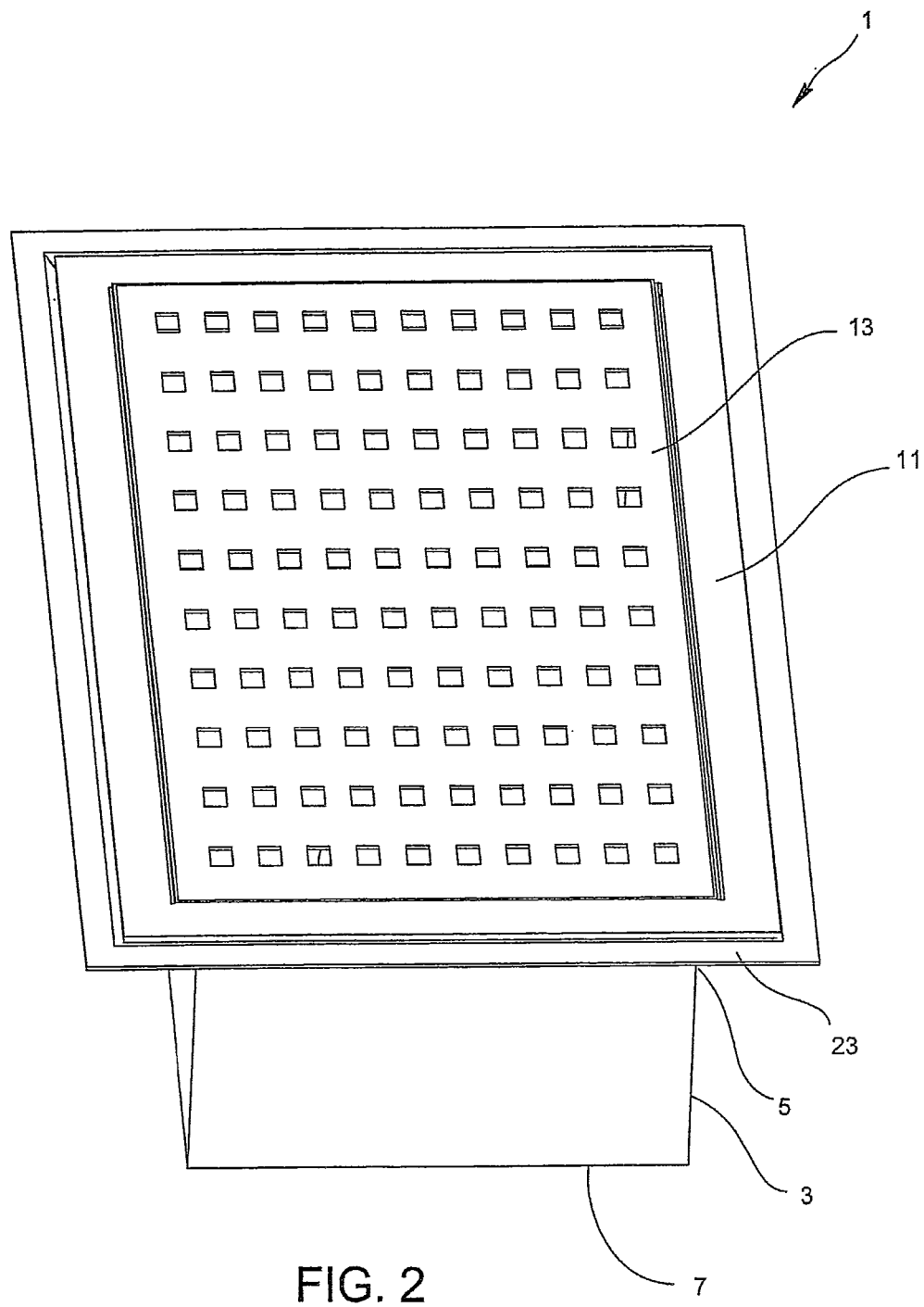
FIG. 2 is a perspective view of the drain assembly in accordance with the present invention.
Figure 3:
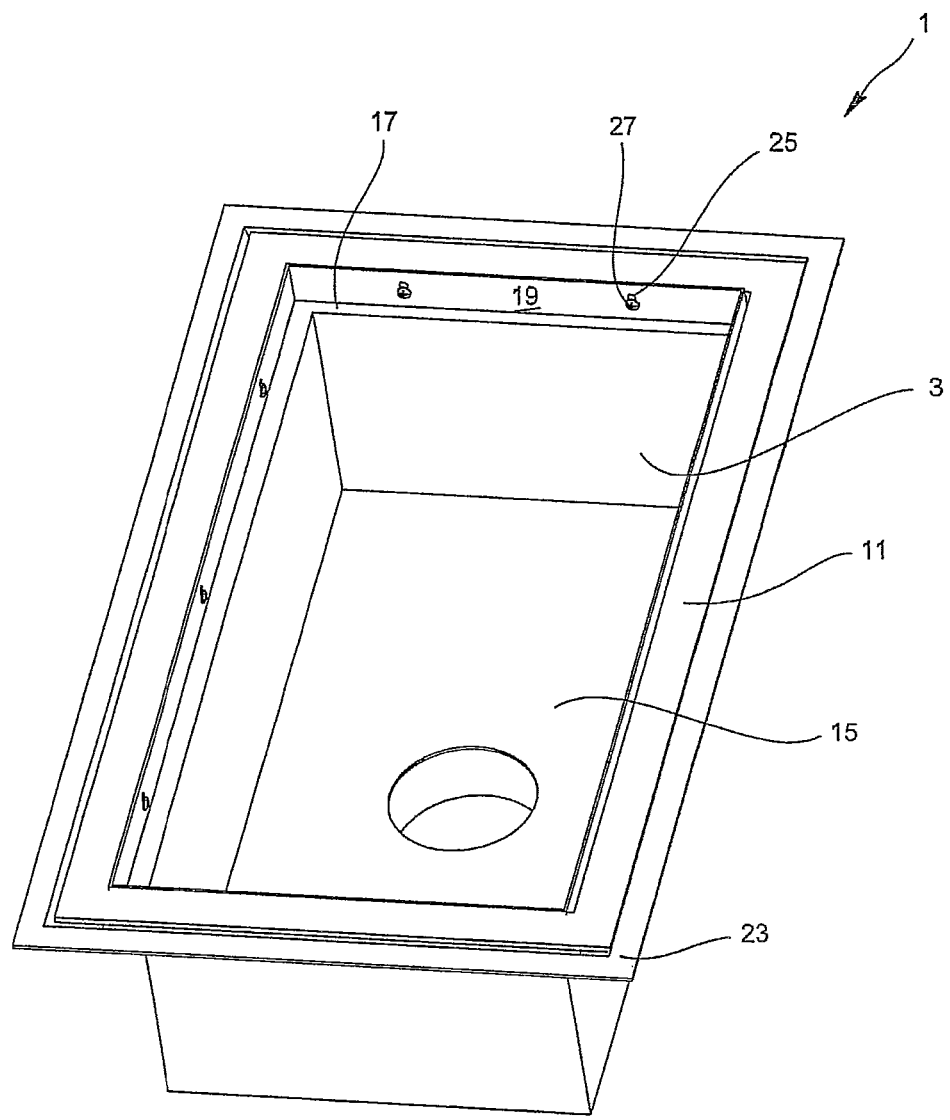
FIG. 3 is a perspective view of the drain assembly of FIG. 2 with a grate removed therefrom.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

With reference to FIGS. 1-5, a drain assembly, denoted generally as reference numeral 1, includes a receptacle body 3 with a first end 5 and a second end 7 defining a cavity 9 therebetween, an adjustable collar 11 and a grate 13. Receptacle body 3 is generally rectangular in shape including four sides.

First end 5 of receptacle body 3 forms an opening 15 into cavity 9, and includes a peripheral step 17 with a connection flange 19 extending substantially perpendicularly therefrom. Peripheral step 17 extends substantially perpendicularly from first end 5 of receptacle body 3. Grate 13 is positioned over opening 15 of receptacle body 3 and supported by peripheral step 17. First end 5 of receptacle body 3 also includes a peripheral flange 21 with a substantially horizontal support portion 23 extending away from connection flange 19. Peripheral flange 21 may be welded to first end 5 of receptacle body 3 or may be formed integrally with receptacle body 3 or attached to the receptacle body 3 in any other manner.

Figure 4:
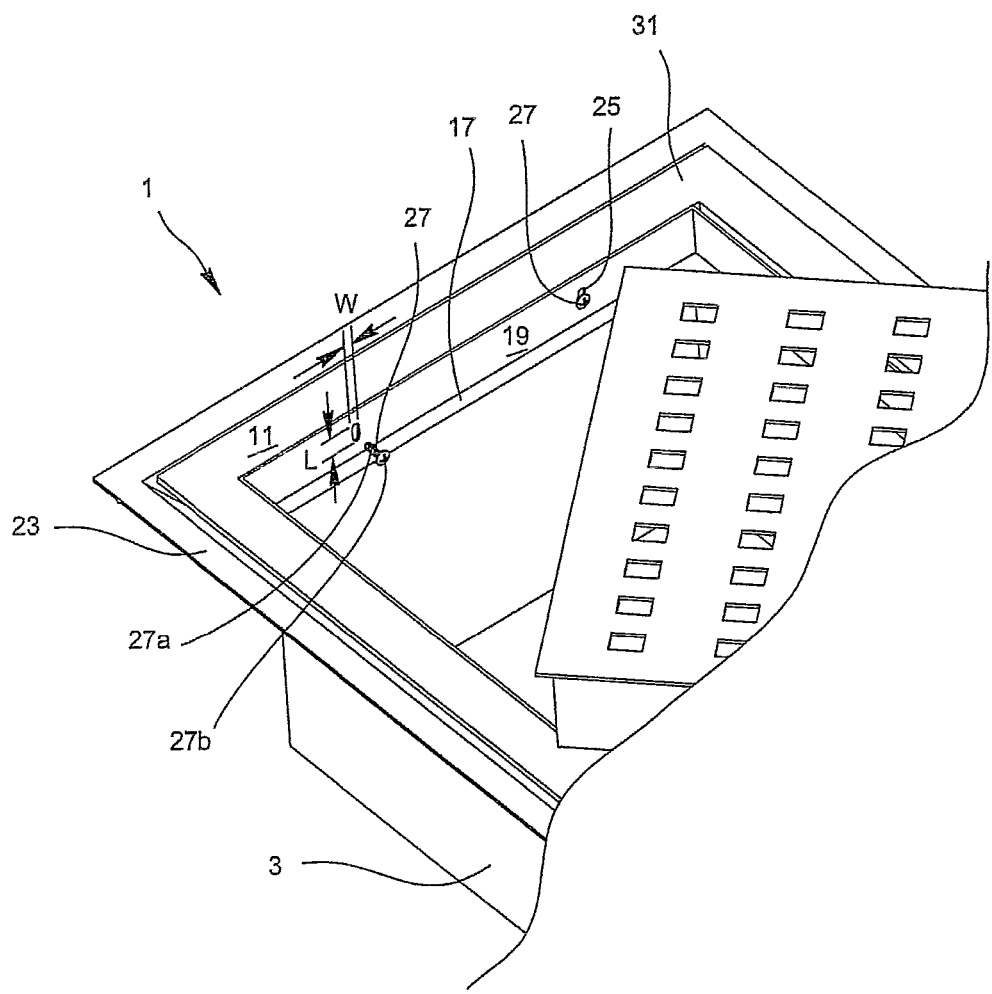
FIG. 4 is a partially exploded portion of a view of the drain assembly of FIG. 3 enlarged for magnification purposes.
Figure 5:
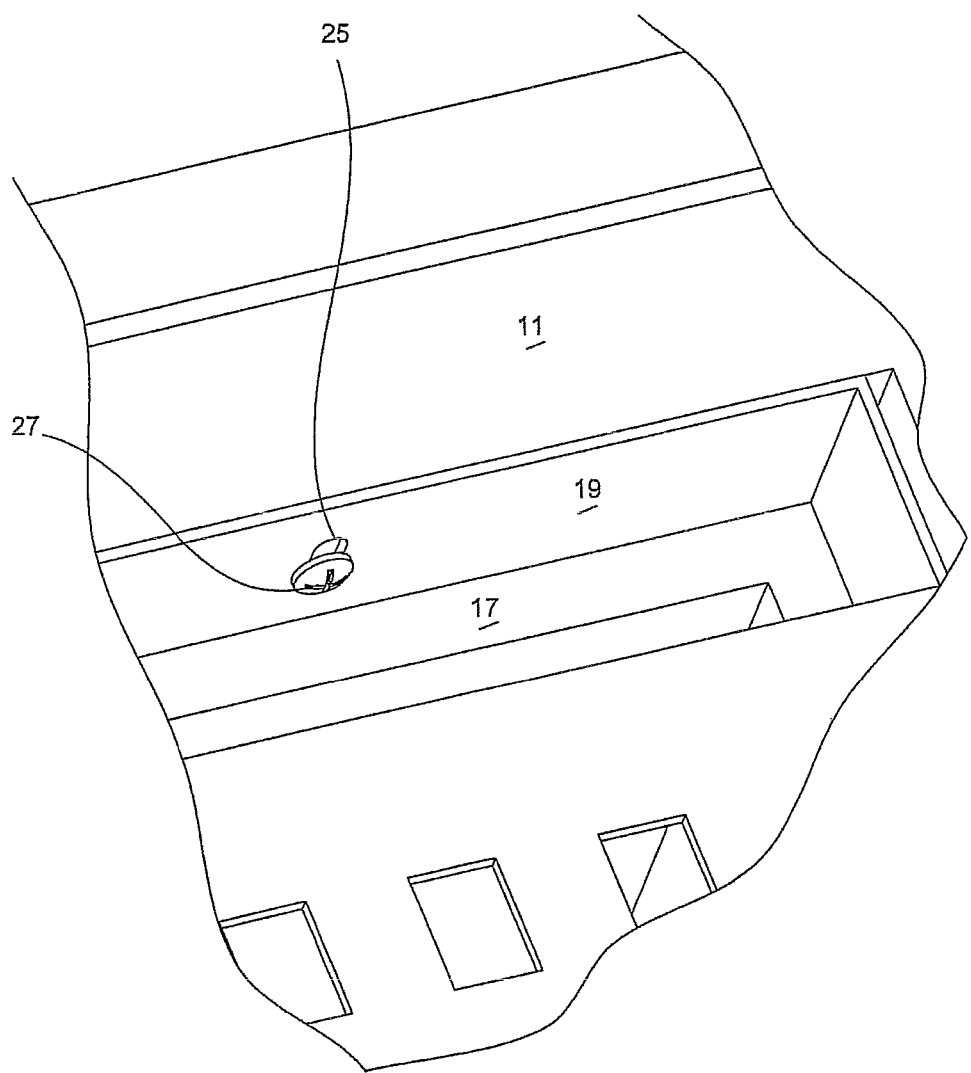
FIG. 5 is a portion of a view of the drain assembly of FIG. 4 enlarged for magnification purposes.

Referring to FIGS. 4 and 5, connection flange 19 includes a at least one elongated, vertically oriented slot 25 (such as substantially elliptical shaped) for accommodating a horizontally-oriented fastening member 27. Connection flange 19 extends peripherally around receptacle body 3 and includes four sides. Each side includes any necessary number of slots 25 and corresponding fastening members 27. The slots 25 include a width W and a length L. The width W is less than the length L. The fastening member 27 includes a shaft 27a and a base 27b. The shaft 27a has a diameter that is slightly less than the width W and less than the length L. The shaft 27a has a size that is greater than the width W and preferably less than the length L. An exemplary embodiment, as illustrated in the figures, includes three slots 25 and fastening members 27 for two parallel sides and two slots 25 and fastening members 27 for the other two parallel sides. Connection flange 19 and peripheral flange 21 also define a channel or passageway 29 therebetween.

Referring to FIGS. 1 and 4, adjustable collar 11 includes a first flange 31 positioned adjacent to connection flange 19 of peripheral step 17 and a second flange 33 extending substantially perpendicular from first flange 31. First flange 31 includes a series of holes 35 which align with the series of slots 25 in connection flange 19.

Referring to FIG. 1, second end 7 of receptacle body 3 is configured with an opening 36 to allow for a connection of a pipe 39 thereto. Pipe 39 may be connected to opening 36 of second end 7 of receptacle body 3 by welding pipe 39 thereto. Opening 36 may also be configured with threads (not shown) to allow for a threaded connection between opening 36 and pipe 39. Any other suitable connections of pipe 39 to opening 36 are also envisioned.

Drain assembly 1 of the present invention is installed via the following steps. First, drain assembly 1 is positioned in an appropriate sized opening in a floor. Next, flooring material 37 is fitted in channel 29 between connection flange 19 and peripheral flange 21. Flooring material 37 may be any appropriate flooring material such as, but not limited to, linoleum and waterproofing material. Flooring material 37 is then secured between second flange 33 of adjustable collar 11 and peripheral flange 21 by passing fastening members 27 through slots 25 of connection flange 19 and the series of holes 35 in first flange 31 of adjustable collar 11 and then tightening fastening members 27. Adjustable collar 11 is secured to connection flange 19 by tightening fastening members 27 inserted through slots 25 of connection flame 19 and holes 35 of adjustable collar 11. Vertical slots 25 in connection flange 19 allow the height of adjustable collar 11 to be adjusted to accommodate for uneven flooring. Finally, an appropriate sized pipe 39 is securely fastened via welding or any other appropriate method to opening 36 in second end 7 of receptacle body 3.

Drain assembly 1 is positioned in a floor of a structure where there will be or is the potential for water to be present. Pipe 39 allows drain assembly 1 to connect the floor to a waste removal system such as a storm or sanitary sewer.

Drain assembly 1 preferably provides a fluid tight seal between itself and flooring material 37. Further, slots 25 of connection flange 21 allow for vertical adjustments of adjustable collar 11 to compensate for uneven flooring. This allows for drain assembly 1 to be positioned on a floor without protruding from the floor or creating a recess in the floor and creating a pleasant flat appearance between the interface of flooring material 37 and grate 13, even if flooring material 37 is uneven or sloped adjacent to grate 13.

While the embodiments were described hereinabove in relation to a floor drain assembly, this is not to be construed as limiting as other uses for drain assembly 1 of the present invention have been envisioned, such as for use as a roof drain assembly. Further, while drain assembly 1 has been described as having a generally rectangular shape, this is also not to be construed as limiting as a variety of other configurations of drain assembly 1 have been envisioned, such as circular, triangular and the like.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A drain assembly comprising:
   a receptacle body with a first end and a second end defining a cavity therebetween, the first end forming an opening into the cavity;
   a peripheral step extending substantially perpendicularly from the first end of the receptacle body;
   a connection flange extending substantially perpendicularly from the peripheral step;
   at least one passageway extending through the connection flange for accommodating at least one fastener; and
   a collar positioned adjacent the connection flange, the collar including at least one hole in alignment with the at least one passageway of the connection flange,
   wherein flooring can coact with the collar so that the flooring is held in place and the collar is secured to the connection flange by tightening the at least one fastener inserted through the at least one passageway of the connection flange and the at least one hole of the collar.

2. The drain assembly of claim 1, wherein the second end of the receptacle body is connected to a pipe.

3. The drain assembly of claim 1, further comprising a grate positioned over the opening of the receptacle body.

4. The drain assembly of claim 1, wherein the flooring is a waterproofing material, linoleum, or any combination thereof.

5. A drain assembly comprising:
   a receptacle body with a first end and a second end defining a cavity therebetween, the first end forming an opening into the cavity;
   a peripheral step extending substantially perpendicularly from the first end of the receptacle body;
   a connection flange extending substantially perpendicularly from the peripheral step;
   at least one passageway extending through the connection flange for accommodating at least one fastener;
   a collar positioned adjacent the connection flange, the collar including at least one hole in alignment with the at least one passageway of the connection flange; and
   flooring that coacts with the collar so that the flooring is held in place and the collar is secured to the connection flange by tightening the at least one fastener inserted through the at least one passageway of the connection flange and the at least one hole of the collar.

6. The drain assembly of claim 5, wherein the second end of the receptacle body is connected to a pipe.

7. The drain assembly of claim 5, further comprising a grate positioned over the opening of the receptacle body.

8. The drain assembly of claim 5, wherein the flooring is a waterproofing material, linoleum, or any combination thereof.

* * * * *